US012631450B2

(12) United States Patent
Ma et al.

(10) Patent No.: US 12,631,450 B2
(45) Date of Patent: May 19, 2026

(54) MULTIMASS MEMS GYROSCOPE FEATURING ORTHOGONAL ARRANGEMENT

(71) Applicant: AAC Kaitai Technologies (Wuhan) CO., LTD., Hubei (CN)

(72) Inventors: Zhao Ma, Wuhan (CN); Shan Yang, Wuhan (CN); Zhan Zhan, Wuhan (CN); Shitao Yan, Wuhan (CN); Xiao Kan, Wuhan (CN); Hongtao Peng, Wuhan (CN); Yang Li, Wuhan (CN); Kahkeen Lai, Singapore (SG); Veronica Tan, Singapore (SG)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 369 days.

(21) Appl. No.: 18/338,374

(22) Filed: Jun. 21, 2023

(65) Prior Publication Data

US 2024/0142234 A1 May 2, 2024

Related U.S. Application Data

(63) Continuation of application No. PCT/CN2022/136304, filed on Dec. 2, 2022.

(30) Foreign Application Priority Data

Oct. 28, 2022 (CN) .......................... 202211334211.X

(51) Int. Cl.
*G01C 19/5733* (2012.01)

(52) U.S. Cl.
CPC ................................. *G01C 19/5733* (2013.01)

(58) Field of Classification Search
None
See application file for complete search history.

(56) References Cited

U.S. PATENT DOCUMENTS

| | | | |
|---|---|---|---|
| 8,256,290 B2 * | 9/2012 | Mao ................... | G01C 19/5719 73/488 |
| 9,551,577 B2 * | 1/2017 | Ruohio .............. | G01C 19/5712 |
| 10,359,284 B2 * | 7/2019 | Coronato .......... | G01C 19/5726 |
| 10,371,521 B2 * | 8/2019 | Johnson ............ | G01C 19/5747 |
| 10,598,690 B2 * | 3/2020 | Simoni ................ | G01P 15/125 |

(Continued)

*Primary Examiner* — Mark A Shabman
(74) *Attorney, Agent, or Firm* — Wiersch Law Group

(57) ABSTRACT

The present invention provides a multimass MEMS gyroscope featuring an orthogonal arrangement, which comprises an anchor point unit, a sensing unit and a driving unit; the anchor point unit comprises a central anchor point subunit located at the center of a rectangle and four corner anchor points located at the four corners of the rectangle respectively; the sensing unit comprises four detection mass blocks each of which has a frame structure and is elastically connected between the central anchor point subunit and the corresponding corner anchor point, receding spaces being formed between the detection mass blocks, and four detection decoupling parts; and the driving unit comprises four driving mass blocks, and driving decoupling parts. The gyroscope can improve the arrangement area of transducers and reduce the mass of the detection mass blocks to improve the Coriolis gain, thereby improving the mechanical sensitivity of the gyroscope.

9 Claims, 3 Drawing Sheets

(56)                References Cited

U.S. PATENT DOCUMENTS

| | | | |
|---|---|---|---|
| 2006/0112764 A1* | 6/2006 | Higuchi | G01C 19/5712 |
| | | | 73/504.12 |
| 2011/0061460 A1* | 3/2011 | Seeger | G01C 19/574 |
| | | | 73/504.12 |
| 2011/0154898 A1* | 6/2011 | Cazzaniga | G01C 19/5747 |
| | | | 73/504.12 |
| 2013/0031977 A1* | 2/2013 | Kempe | G01C 19/56 |
| | | | 73/504.04 |
| 2017/0234684 A1* | 8/2017 | Coronato | G01C 19/5747 |
| | | | 73/504.12 |
| 2020/0166341 A1* | 5/2020 | Zou | G01C 19/5712 |
| 2022/0178696 A1* | 6/2022 | Kaajakari | G01C 19/5649 |

* cited by examiner

MULTIMASS MEMS GYROSCOPE FEATURING ORTHOGONAL ARRANGEMENT

TECHNICAL FIELD

The present invention relates to the technical field of gyroscopes, in particular to a multimass MEMS gyroscope featuring an orthogonal arrangement.

BACKGROUND

A micro electro mechanical systems (MEMS) gyroscope is a micro angular velocity sensor made by micromachining technology and microelectronics technology. MEMS gyroscopes typically include tuning fork type, ring type, nested ring type, disk type, hemispherical type and so on. As a novel gyroscope, an MEMS mass distributed gyroscope has a degenerate mode like a ring type gyroscope, thus having highly symmetrical drive and sense modes. The angular velocity input is calculated by means of the energy of the sense mode.

A mass distributed gyroscope in the related art has the disadvantages of small drive/detection capacitance and low Coriolis gain, which leads to low detection sensitivity of the gyroscope and greatly limits the application of the gyroscope.

Therefore, it is necessary to provide a multimass MEMS gyroscope with high sensitivity to improve the related art, enlarge the arrangement area of drive/detection capacitors of the gyroscope, and improve the Coriolis gain of the gyroscope.

SUMMARY

The present invention provides a multimass MEMS gyroscope featuring an orthogonal arrangement, aiming to solve the problems of small drive/detection capacitance and low Coriolis gain of a mass distributed gyroscope in the related art, enlarge the arrangement area of drive/detection transducers of the gyroscope, and improve the Coriolis gain of the gyroscope, so as to improve the sensitivity of the gyroscope.

The technical scheme of the present invention is as follows.

A multimass MEMS gyroscope featuring an orthogonal arrangement comprises an anchor point unit, a sensing unit elastically connected to the anchor point unit, and a driving unit elastically connected to the anchor point unit and the sensing unit, wherein the anchor point unit comprises a central anchor point subunit located at the center of a rectangle and four corner anchor points located at the four corners of the rectangle respectively;

the sensing unit comprises four detection mass blocks each of which has a frame structure and is elastically connected between the central anchor point subunit and the corresponding corner anchor point, receding spaces being formed between the detection mass blocks, and four detection decoupling parts located in the frame structures of the detection mass blocks respectively and elastically connected to the detection mass blocks correspondingly; and the driving unit comprises four driving mass blocks respectively located in the receding spaces, and driving decoupling parts elastically connected to the driving mass blocks respectively, the driving mass blocks being located in the rectangle and elastically connected to the adjacent detection mass blocks.

Further, the central anchor point subunit comprises a coupling ring located at the center of the rectangle and a central anchor point arranged around the coupling ring.

Further, the driving decoupling parts comprise first driving decoupling parts respectively located outside the driving mass blocks and second driving decoupling parts located between the driving mass blocks and the coupling ring.

Still further, the first driving decoupling parts are located outside the rectangle, and a first transducer is arranged outside each first driving decoupling part.

Further, an outer wall of the coupling ring extends outward in the direction of a center line of the rectangle to form four first flexible beams respectively connected to the second driving decoupling parts, the driving mass blocks extend inward in the direction of the center line of the rectangle to form second flexible beams connected to the second driving decoupling parts correspondingly, and two ends of each second driving decoupling part extend to two sides in a direction perpendicular to the first flexible beams and the second flexible beams to form first elastic beams connected to the central anchor point.

Further, an outer wall of a side, close to the corresponding driving mass block, of each first driving decoupling part extends towards the driving mass block to form a first guide beam, and an end, away from the first driving decoupling part, of the first guide beam is connected to the driving mass block.

Further, two ends of each first driving decoupling part extend inward to form third elastic beams connected to the adjacent corner anchor points.

Further, the coupling ring extends outward to form four second connecting beams respectively connected to the detection mass blocks, and each second connecting beam comprises a third flexible beam extending from the corresponding detection mass block toward the coupling ring in a diagonal direction of the rectangle, and a second elastic beam extending from an end, away from the detection mass block, of the third flexible beam in a circumferential direction of the coupling ring and connected to an inner wall of the coupling ring.

Further, the anchor point unit further comprises decoupling anchor points located inside the frame structures of the detection mass blocks and arranged side by side with the detection decoupling parts, and an outer wall of each detection decoupling part extends in a direction perpendicular to a corresponding diagonal of the rectangle to form a fourth elastic beam connected to the decoupling anchor point.

Further, the outer wall of each detection decoupling part extends in the direction of the corresponding diagonal of the rectangle to form a fifth elastic beam connected to an inner wall of the corresponding detection mass block.

Further, coupling structures are connected between the driving mass blocks and the adjacent detection mass blocks to realize elastic connection.

Further, the detection decoupling part has a frame structure in which a second transducer is embedded, and the driving mass block has a frame structure in which an orthogonal suppression electrode is embedded.

Further, the first transducers comprise any one or any combination of a capacitive transducer, an inductive transducer, a thermoelectric transducer and a piezoelectric transducer, and the second transducers comprise any one or any combination of a capacitive transducer, an inductive transducer, a thermoelectric transducer and a piezoelectric transducer.

The principle of the present invention is as follows:

in a drive mode, the driving decoupling parts drive the driving mass blocks to make in-plane movements in the direction of 0°/90°, at the same time, the driving mass blocks drive the detection mass blocks located in the direction of 45°/135° to make in-plane movements in the tangential direction of 45°/135° to rotate around an axial center of the gyroscope, and the movement directions of the four driving mass blocks and the four detection mass blocks form a differential mode; and in a sense mode, when the MEMS gyroscope is subjected to an external angular velocity ω orthogonal to an in-plane direction, according to the Coriolis principle, the angular velocity ω will generate an in-plane Coriolis force perpendicular to the movement direction of the detection mass blocks, which will force the detection mass blocks to move in a direction perpendicular to the drive mode, that is, in the direction of 45°/135°, and the movement directions of the four detection mass blocks are of a differential mode, thus realizing differential detection.

The present invention has the following beneficial effects:

1. The driving decoupling parts are distributed outside the driving mass blocks, which facilitates the arrangement of the first transducers, greatly increases the arrangement area and utilization rate of the transducers, and facilitates driving of greater amplitude, thus improving the sensitivity;

2. The detection mass block has a frame structure, so that the arrangement area of the second transducers is increased, and more energy conversion can be realized, thereby amplifying detection signals and improving the mechanical sensitivity;

3. The detection mass block has a frame structure, which effectively reduces the mass of the detection mass block and can greatly improve the Coriolis gain, thus improving the mechanical sensitivity;

4. In the drive mode, the displacement of the detection mass block is small, and the detection mass block plays a decoupling role, which reduces the displacement of the detection decoupling part, makes the detection decoupling part in a basically displacement-free state, and suppresses the orthogonal error; and in the sense mode, the driving mass block basically moves in a translation manner, and the driving decoupling part basically has no displacement, thus reducing the orthogonal error; and 5. Through the co-coupling of the coupling ring, the frequency difference between a parasitic mode and a working mode is effectively increased, and the interference of the parasitic mode is reduced.

DETAILED DESCRIPTION OF EMBODIMENTS

The present invention will be further described below with reference to the accompanying drawings and embodiments.

Figure 1:
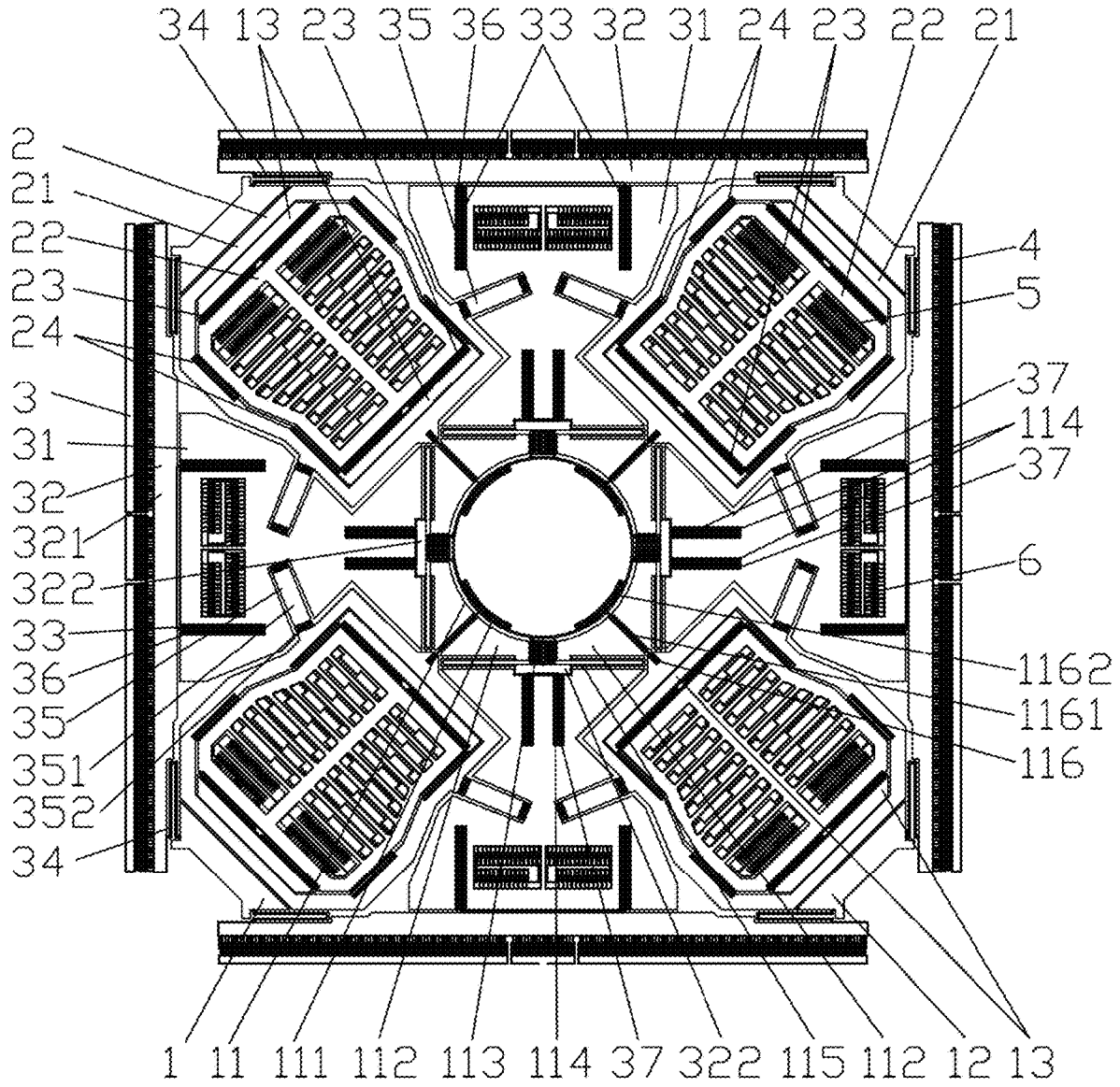
FIG. 1 is a top view of an MEMS gyroscope in an embodiment of the present invention.

As shown in FIG. 1, a multimass MEMS gyroscope featuring an orthogonal arrangement provided by an embodiment of the present invention comprises an anchor point unit 1, a sensing unit 2 elastically connected to the anchor point unit 1, and a driving unit 3 elastically connected to the anchor point unit 1 and the sensing unit 2, wherein the anchor point unit 1 comprises a central anchor point subunit 11 located at the center of a rectangle and four corner anchor points 12 located at the four corners of the rectangle respectively;

the sensing unit 2 comprises four detection mass blocks 21 each of which has a frame structure and is elastically connected between the central anchor point subunit 11 and the corresponding corner anchor point 12, receding spaces being formed between the detection mass blocks, and four detection decoupling parts 22 located in the frame structures of the detection mass blocks 21 respectively and elastically connected to the detection mass blocks 21 correspondingly; and the driving unit 3 comprises four driving mass blocks 31 respectively located in the receding spaces, and driving decoupling parts 32 elastically connected to the driving mass blocks 31 respectively, the driving mass blocks 31 being located in the rectangle and elastically connected to the adjacent detection mass blocks 21.

The gyroscope of the present invention has two modes when working, namely a drive mode and a sense mode. The angular velocity sensitivity principle of the gyroscope is described below in combination with the working mode of the gyroscope.

Figure 2:
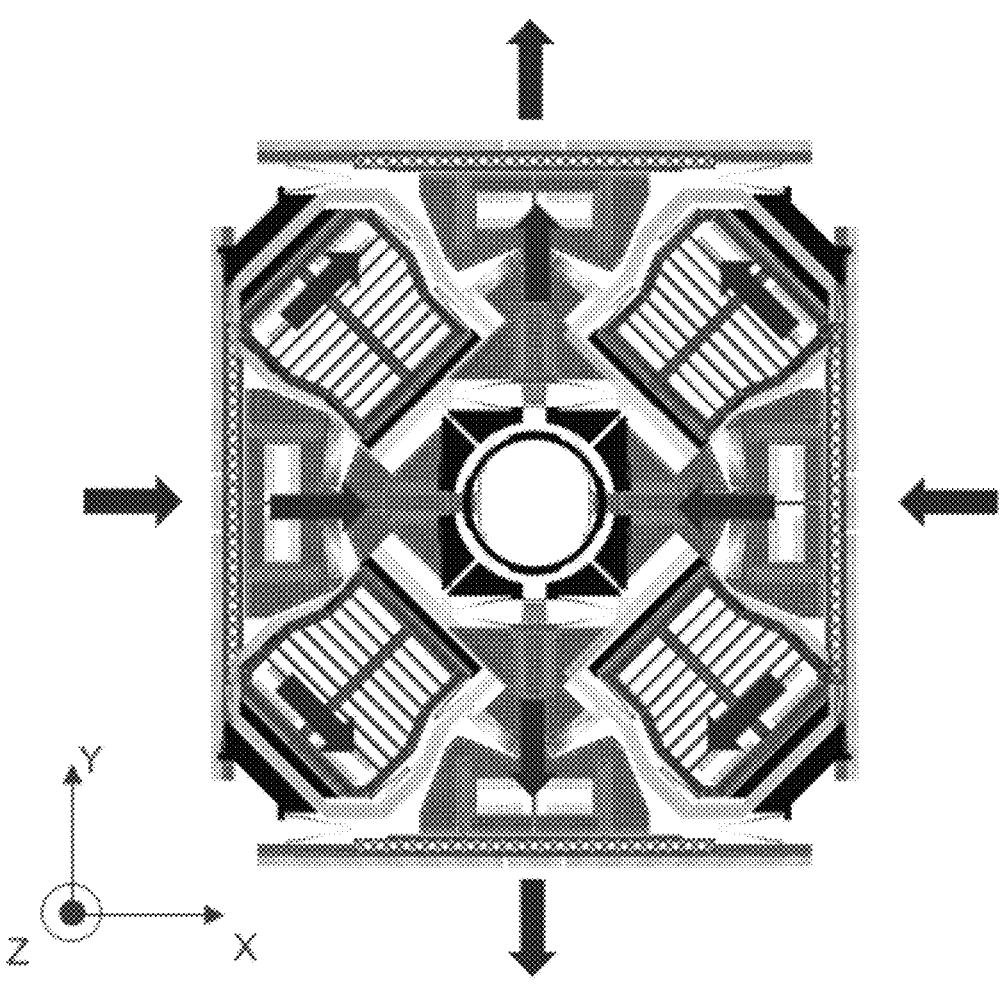
FIG. 2 is a state diagram of an MEMS gyroscope in a drive mode in an embodiment of the present invention.

Specifically, as shown in FIG. 2, when the gyroscope according to the embodiment of the present invention is in the drive mode, the two driving mass blocks 31 located in the 0° direction make in-plane movements in a direction close to the axial center, the two driving mass blocks 31 located in the 90° direction make in-plane movements in a direction away from the axial center, and the movement directions of the four driving mass blocks 31 are of a differential form; and the driving mass blocks 31 drive the two detection mass blocks 21 in the 45° direction to make in-plane rotation counterclockwise, and drive the two detection mass blocks 21 in the 135° direction to make in-plane rotation clockwise, and the movement directions of the four detection mass blocks 21 are of a differential mode.

Figure 3:
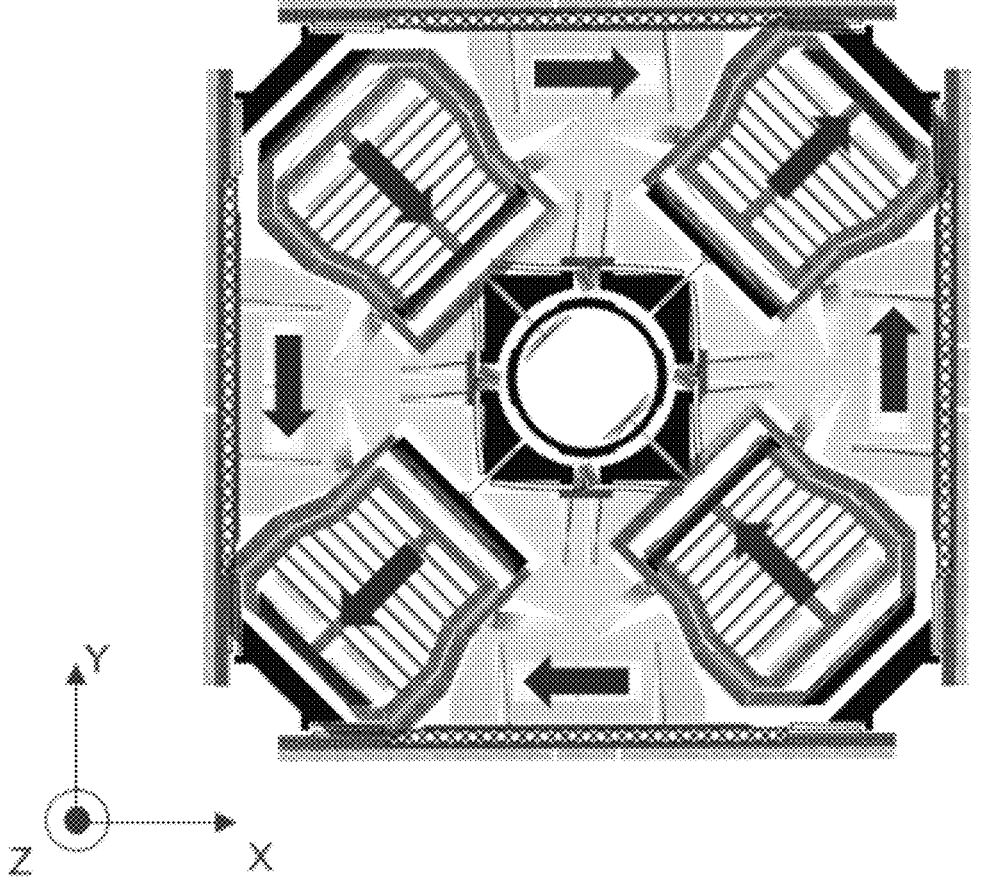
FIG. 3 is a state diagram of an MEMS gyroscope in a sense mode in an embodiment of the present invention.

As shown in FIG. 3, when the gyroscope of the present invention is subjected to an angular velocity ω in the direction of Z axis (orthogonal to the plane), according to the Coriolis principle, the angular velocity ω will generate a Coriolis force in the direction of 45°/135°, and the Coriolis force will force the gyroscope to generate vibration to detect modal shapes. Specifically, the two detection mass blocks 21 located at 45° move away from the axial center in the direction of 45°, the two detection mass blocks 21 located at 135° move in the direction of 135° toward the axial center, and the four detection mass blocks 21 form differential detection in the sense mode. Finally, the angular velocity ω can be obtained by detecting the vibration displacement of the four detection mass blocks 21 in the direction of 45°/135°.

The specific structure of each component of the multimass MEMS gyroscope of the present invention will be described below.

As shown in FIG. 1, the central anchor point subunit 11 comprises a coupling ring 111 located at the center of the rectangle and a central anchor point 112 arranged around the coupling ring 111.

As shown in FIG. 1, the driving decoupling parts 32 comprise first driving decoupling parts 321 respectively located outside the driving mass blocks 31 and second driving decoupling parts 322 located between the driving mass blocks 31 and the coupling ring 111. It can be understood that in this embodiment, there are four first driving decoupling parts 321 and four second driving decoupling parts 322.

As shown in FIG. 1, the first driving decoupling parts 321 are located outside the rectangle, and two ends of each first driving decoupling part 321 extend inward to form third elastic beams 34 connected to the adjacent corner anchor points 12, so that the first driving decoupling parts 321 are elastically connected to the corner anchor points 12. Specifically, gaps are formed between the two ends of each first driving decoupling part 321 and the adjacent corner anchor point 12 and detection mass block 21, and the third elastic beam 34 is located in the gaps between the first driving decoupling part 321 and the adjacent corner anchor point 12 and detection mass block 21. The third elastic beam 34 has a degree of freedom in a driving direction of the first driving decoupling part 321, which enables the first driving decoupling part 321 to move in the direction close to or away from the axial center in the drive mode. Meanwhile, the third elastic beam 34 has a great rigidity in a direction perpendicular to the driving direction of the first driving decoupling part 321, which prevents the first driving decoupling part 321 from moving in the direction perpendicular to the driving direction in the sense mode.

As shown in FIG. 1, an outer wall of a side, close to the corresponding driving mass block 31, of each first driving decoupling part 321 extends towards the driving mass block 31 to form a first guide beam 33, and an end, away from the first driving decoupling part 321, of the first guide beam 33 is connected to the driving mass block 31. Specifically, a side, close to the corresponding first driving decoupling part 321, of the driving mass block 31 is provided with a first connecting gap 36, and the first guide beam 33 is located in the first connecting gap 36. The first guide beam 33 has a degree of freedom in the direction perpendicular to the driving direction of the first driving decoupling part 321, and has a great rigidity in the driving direction of the first driving decoupling part 321.

In the drive mode, the first driving decoupling parts 321 drive the driving mass blocks 31 to move in the direction close to or away from the axial center; and in the sense mode, the driving mass blocks 31 move in the direction perpendicular to the driving direction due to the Coriolis force, and the first driving decoupling parts 321 are decoupled from the driving mass blocks 31.

As shown in FIG. 1, an outer wall of the coupling ring 111 extends outward in the direction of a center line of the rectangle to form four first flexible beams 113 respectively connected to the second driving decoupling parts 322, the driving mass blocks 31 extend inward in the direction of the center line of the rectangle to form second flexible beams 114 connected to the second driving decoupling parts 322 correspondingly, and two ends of each second driving decoupling part 322 extend to two sides in a direction perpendicular to the first flexible beams 113 and the second flexible beams 114 to form two first elastic beams 115 connected to two adjacent central anchor points 112 respectively. Specifically, the first flexible beam 113 is located between the two adjacent central anchor points 112, and the first elastic beam 115 is located outside the two central anchor points 112.

Further, a side, close to the coupling ring 111, of the driving mass block 31 is provided with a second connecting gap 37, and the second flexible beam 114 is located in the second connecting gap 37.

The first flexible beam 113 and the second flexible beam 114 have a degree of freedom in the direction perpendicular to the driving direction of the first driving decoupling part 321, and have a great rigidity in the driving direction of the first driving decoupling part 321. The first elastic beam 115 has a degree of freedom in the driving direction of the first driving decoupling part 321, so that the second driving decoupling part 322 can move in the direction close to or away from the axial center in the drive mode. Meanwhile, the first elastic beam 115 has a great rigidity in the direction perpendicular to the driving direction of the first driving decoupling part 321, which prevents the second driving decoupling part 322 from moving in the direction perpendicular to the driving direction in the sense mode.

In the drive mode, the first driving decoupling parts 321 drive the driving mass blocks 31 to move in the direction close to or away from the axial center of the gyroscope, and the second driving decoupling parts 322 move in the same direction with the driving mass blocks 31. In the sense mode, the driving mass blocks 31 move in the direction perpendicular to the driving direction due to the Coriolis force, and the second driving decoupling parts 322 are decoupled from the driving mass blocks 31. As shown in FIG. 1, a coupling structure 35 is connected between each driving mass block 31 and the adjacent detection mass block 21 to realize elastic connection. It can be understood that there are eight coupling structures 35, which are respectively connected between four driving mass blocks 31 and two adjacent detection mass blocks 21. In this embodiment, each driving mass block 31 is provided with grooves at positions close to two adjacent detection mass blocks 21, and the coupling structures 35 are located in the corresponding grooves. Specifically, the coupling structure 35 comprises a coupling mass block 351 and coupling beams 352 connected between the coupling mass block 351 and the adjacent driving mass block 31 and detection mass block 21. In the drive mode, the driving mass blocks 31 drive the detection mass blocks 21 to rotate clockwise or counterclockwise through the coupling structures 35.

As shown in FIG. 1, the anchor point unit 1 further comprises decoupling anchor points 13 located inside the frame structures of the detection mass blocks 21 and arranged side by side with the detection decoupling parts 22, and an outer wall of each detection decoupling part 22 extends in a direction perpendicular to a corresponding diagonal of the rectangle to form a fourth elastic beam 23 connected to the decoupling anchor point 13. In this embodiment, two decoupling anchor points 13 are arranged in the frame structure of each detection mass block 21, which are respectively located at the two sides, close to and away from the center of the rectangle, of the corresponding detection decoupling part 22, and the two decoupling anchor points 13 are respectively connected to outer walls of the two sides, close to and away from the center of the rectangle, of the detection decoupling part 22 through the fourth elastic beams 23. The fourth elastic beam 23 has a degree of freedom in a corresponding diagonal direction of the rectangle, but has a great rigidity in a direction perpendicular to the diagonal direction.

The outer wall of each detection decoupling part 22 extends in the direction of the corresponding diagonal of the rectangle to form a fifth elastic beam 24 connected to an inner wall of the corresponding detection mass block 21. In this embodiment, as shown in FIG. 1, four fifth elastic beams 24 are arranged between each detection decoupling part 22 and the corresponding detection mass block 21. The fifth elastic beam 24 has a degree of freedom in the direction perpendicular to the corresponding diagonal direction of the rectangle, that is, the degree of freedom in the rotation direction of the detection mass block 21, and has a great rigidity in the corresponding diagonal direction of the rectangle.

In the drive mode, the detection mass block 21 rotates clockwise or counterclockwise, and the detection decoupling part 22 is decoupled from the detection mass block 21. In the sense mode, the detection mass block 21 moves in the direction of 45°/135° away from or close to the axial center, that is, in the diagonal direction of the rectangle, and the detection decoupling part 22 moves with the detection mass block 21 in this case.

As shown in FIG. 1, the coupling ring 111 extends outward to form four second connecting beams 116 respectively connected to the detection mass blocks 21, and each second connecting beam 116 comprises a third flexible beam 1161 extending from the corresponding detection mass block 21 toward the coupling ring 111 in the diagonal direction of the rectangle, and a second elastic beam 1162 extending from an end, away from the detection mass block 21, of the third flexible beam 1161 in a circumferential direction of the coupling ring 111 and connected to an inner wall of the coupling ring 111. The third flexible beam 1161 has a degree of freedom to rotate around the circumference of the gyroscope (that is, in the circumferential direction of the coupling ring 111), and has a great rigidity in a radial direction of the gyroscope (that is, in the diagonal direction of the rectangle); and the second elastic beam 1162 has a degree of freedom in the radial direction of the gyroscope (that is, in the diagonal direction of the rectangle), and has a great rigidity in the circumferential direction of the gyroscope (that is, in the circumferential direction of the coupling ring 111).

As shown in FIG. 1, first transducers 4 are arranged outside the first drive decoupling parts 32, the detection decoupling part 22 has a frame structure in which second transducers 5 are embedded, and the driving mass block 31 has a frame structure in which orthogonal suppression electrodes 6 are embedded. Specifically, the first transducers 4 comprise any one or any combination of a capacitive transducer, an inductive transducer, a thermoelectric transducer and a piezoelectric transducer, and the second transducers 5 comprise any one or any combination of a capacitive transducer, an inductive transducer, a thermoelectric transducer and a piezoelectric transducer.

The above are only embodiments of the present invention, and it should be pointed out here that for those of ordinary skill in the art, improvements can be made without departing from the inventive concept of the present invention, which belong to the protection scope of the present invention.

What is claimed is:

1. A multimass MEMS gyroscope featuring an orthogonal arrangement, comprising an anchor point unit, a sensing unit elastically connected to the anchor point unit, and a driving unit elastically connected to the anchor point unit and the sensing unit, wherein the anchor point unit comprises a central anchor point subunit located at a center of a rectangle and four corner anchor points located at four corners of the rectangle respectively;

the sensing unit comprises four detection mass blocks each of which has a frame structure and is elastically connected between the central anchor point subunit and the corner anchor point closer to the detection mass block, receding spaces being formed between the detection mass blocks, and four detection decoupling parts located in the frame structures of the detection mass blocks respectively and elastically connected to the detection mass blocks correspondingly; and the driving unit comprises four driving mass blocks respectively located in the receding spaces, and driving decoupling parts elastically connected to the driving mass blocks respectively, the driving mass blocks being located in the rectangle and elastically connected to the adjacent detection mass blocks;

wherein the central anchor point subunit comprises a coupling ring located at the center of the rectangle and a central anchor point arranged around the coupling ring;

wherein the driving decoupling parts comprise four first driving decoupling parts respectively located outside the driving mass blocks, and the rectangle is enclosed by the four first driving decoupling parts;

wherein four center lines of the rectangle are formed by the lines connecting the center of the four first driving decoupling parts to the center of the rectangle and the four driving mass blocks are adjacent to the center of the four first driving decoupling parts respectively.

2. The multimass MEMS gyroscope according to claim 1, wherein the driving decoupling parts further comprise second driving decoupling parts located between the driving mass blocks and the coupling ring, the first driving decoupling parts are located outside the rectangle, and a four first transducer is are arranged respectively on a side of each of the first drive decoupling member opposite to the central anchor point.

3. The multimass MEMS gyroscope according to claim 2, wherein an outer wall of the coupling ring extends toward the four driving mass blocks in the direction of the four center lines of the rectangle to form four first flexible beams respectively connected to the second driving decoupling parts, the driving mass blocks extend toward the central anchor point in the direction of the four center lines of the rectangle to form second flexible beams connected to the second driving decoupling parts correspondingly, and two ends of each of the second driving decoupling part extend in a direction perpendicular to the first flexible beams and the second flexible beams to form first elastic beams connected to the central anchor point.

4. The multimass MEMS gyroscope according to claim 2, wherein an outer wall of a side, closer to the central anchor point, of each of the first driving decoupling part extends towards the central anchor point to form a first guide beam, and an end, closer to the central anchor point, of the first guide beam is connected to the driving mass block.

5. The multimass MEMS gyroscope according to claim 2, wherein two ends of each of the first driving decoupling part extend toward the central anchor point to form third elastic beams connected to the adjacent corner anchor points.

6. The multimass MEMS gyroscope according to claim 5, wherein the anchor point unit further comprises decoupling anchor points located inside the frame structures of the detection mass blocks and arranged adjacent to the detection decoupling parts, an outer wall of each of the detection decoupling part extends in a direction perpendicular to a corresponding diagonal of the rectangle to form a fourth elastic beam connected to the decoupling anchor point, and the outer wall of each of the detection decoupling part extends in the direction of the corresponding diagonal of the rectangle to form a fifth elastic beam connected to an inner wall of the corresponding detection mass block.

7. The multimass MEMS gyroscope according to claim 2, wherein the detection decoupling part has a frame structure in which a second transducer is embedded, and the driving mass block has a frame structure in which an orthogonal suppression electrode is embedded.

8. The multimass MEMS gyroscope according to claim 1, wherein the coupling ring extends toward the four detection mass blocks to form four second connecting beams respectively connected to the four detection mass blocks, and each of the second connecting beam comprises a third flexible beam connecting the detection mass block with the coupling ring in a diagonal direction of the rectangle, and a second elastic beam extending from an end, closer to the coupling ring, of the third flexible beam in a circumferential direction of the coupling ring and connected to an inner wall of the coupling ring.

9. The multimass MEMS gyroscope according to claim 1, wherein coupling structures are connected between the driving mass blocks and the adjacent detection mass blocks to realize elastic connection.

\* \* \* \* \*